July 25, 1950  W. E. NICKERSON  2,516,245
AUTOMATIC HOLDING DEVICE FOR FISHING POLES AND RODS
Filed Feb. 11, 1949

INVENTOR.
WARD E. NICKERSON
BY
Charles S. Penfold
ATTORNEY

Patented July 25, 1950

2,516,245

UNITED STATES PATENT OFFICE 2,516,245

AUTOMATIC HOLDING DEVICE FOR FISHING POLES AND RODS

Ward E. Nickerson, Tekonsha, Mich.

Application February 11, 1949, Serial No. 75,767

11 Claims. (Cl. 248—42)

This invention relates generally to supports and more particularly is directed to a device for supporting a fish pole with respect to any desirable mounting such as a side or end of a boat.

Various supports have been devised for the purpose of supporting fish poles, but the majority have not proven successful under all conditions of use. Many of these contrivances are cumbersome, complicated, spring actuated, and difficult to operate and adjust. Some have the distinct disadvantage that the pole must be threaded into and out of a socket, eye, or loop, while others are provided with a mechanism which necessitates prior manual adjustment to receive the pole and subsequent manual adjustment to release it.

It is therefore one of the principal objects of the invention to overcome the disadvantages above referred to by providing a unique device which will enable one to have the full and free use of both hands to manipulate the pole. In other words, the device is designed and constructed for operation by the pole, thereby making it unnecessary to manually engage the device to lock and unlock the pole relative thereto. This factor becomes important particularly at the moment an indication or signal is received that a fish has taken the hook.

More specifically in this respect, the device contemplates the utilization of a holder comprised of a pair of complementary jaws associated with a carriage, the arrangement being such that the jaws will automatically embrace or entrap the pole when it is seated in the holder and when the pole is lifted in the customary way the jaws will automatically open to release the pole; the jaws always remaining normally open to receive a pole.

An important object of the invention is to provide the carriage with bifurcations or forks for receiving the pole at the same time it is entrapped by the jaws so as to afford additional support for the pole.

Another object of the invention is to provide the carriage with a spindle to which the jaws are pivotably connected, one end of the spindle in turn being pivotably connected to one extremity of the carriage.

An additional object of the invention is to provide the device with a mounting for attaching the device to a suitable support and the mounting and carriage with adjustable means whereby the carriage and holder as a unit may be rotated and tilted with respect to the mounting in order that the pole may be positioned at the angle desired.

A further object of the invention is to design and construct the adjustable means so that it can be easily and quickly operated, but is positive in action for locking the unit in any position desired within practicable limits.

A still further object of the invention is to provide the adjustable means with a roller bearing whereby to promote the ease of adjustment.

The device also possesses attributes of simplicity, durability, and low cost of manufacture and assembly on a production basis.

Many other objects and advantages of the invention will become apparent after the description hereinafter set forth is considered in conjunction with the drawing annexed hereto.

Referring to the drawing wherein like parts are identified by the same numerals:

Figures 1, 2:
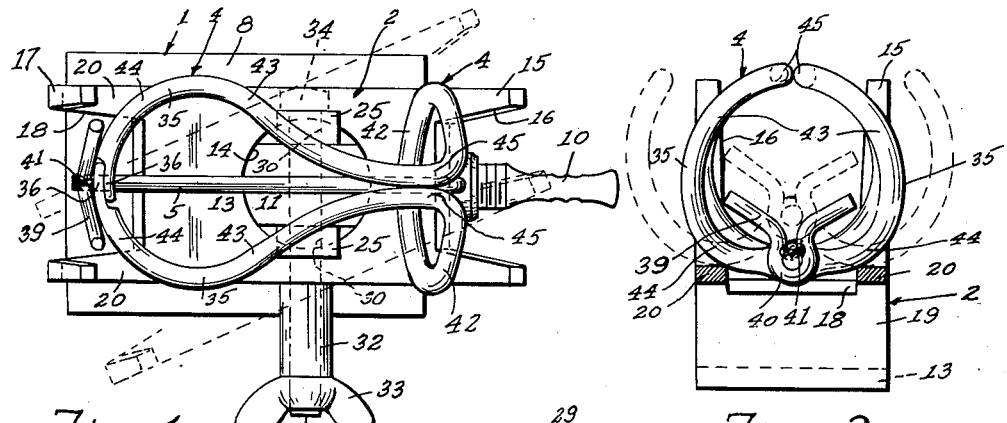
Figure 1 is a top view of the device.
Figure 2 is a transverse section in elevation taken through an appropriate part of Figure 1.

The device embodying the improved principles of design and construction of the subject invention includes a mounting 1, a carriage 2 attached to the mounting by adjustable locking means 3, and a pole holder or cradle 4 operatively connected to the carriage by a spindle 5.

The mounting 1 may be constructed as desired but as herein depicted includes a C-clamp comprising a pair of legs 6 and 7 joined by a bridge 8. This clamp is adapted to receive the side or end wall 9 of a boat or other support and the leg 7 carries a set screw 10 for firmly securing the clamp in place. The bridge 8 constitutes a platform for an upstanding arcuate bearing or track 11, the ends of which are preferably welded to the platform as indicated at 12. This bearing is offset and located adjacent the inner side of the platform for stability and convenience in operating the adjustable means 3.

Figure 5:
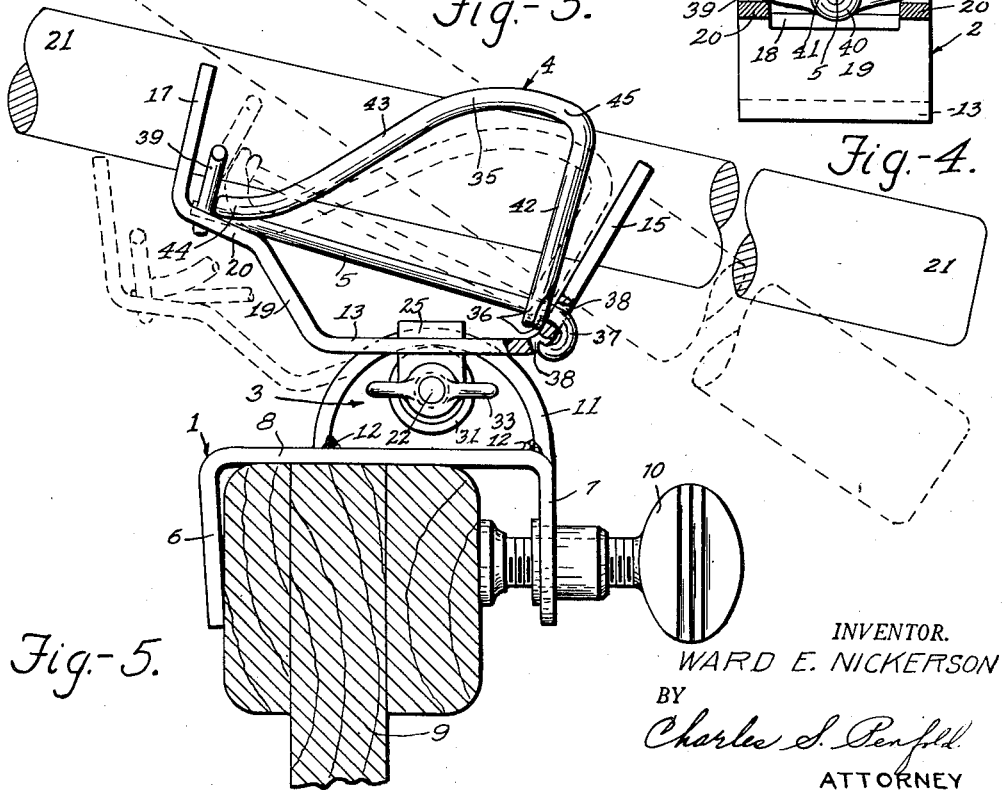
Figure 5 is a side view of the device applied, for example, to the side of a boat and showing at least two positions of the holder and carriage in the act of supporting a fish pole or rod.

The carriage 2 is unique in character and includes a flat base 13 having a large circular centrally disposed opening 14 therein, an upwardly and rearwardly extending part 15 having a relatively large tapered notch 15 to provide a fork or bifurcation for the reception of a pole, and a forward upstanding part 17 having a relatively large tapered notch 18 to provide a similar fork or bifurcation. The forward part 17 is joined to the base 13 by a portion 19 extending outwardly from the base at substantially the same angle as part 15 and by spaced corresponding supporting portions 20, formed by the notch 18, which are arranged substantially at right angles to part 17. A fish pole or rod 21 as illustrated in Figure 5 is received in the holder or cradle 4 when disposed in the forks or bifurcations, all of which will be described more in detail subsequently. Although a fish pole or rod is referred to it is to be understood that the device is suitable for supporting any other instrumentality such as a flag staff.

The carriage, as stated above, is preferably connected to the mounting by the adjustable locking means 3, which resembles a vise. The means 3 embodies improved principles of design and construction and includes a bolt 22, disposed between the arcuate track 11 and the platform 8, and a pair of lugs 23 and 24 carried thereby which straddle the track and project upwardly into the circular opening 14 in the base 13 of the carriage so that lateral offsets 25 formed adjacent the upper ends of the lugs find support on the upper planar surface of the base. The lower ends of the lugs are formed with offset abutments 26 and the outer side of each lug intermediate the lateral offset and abutment is rounded as indicated at 27 to correspond with the radius or curvature of opening 14. The material defining the margin of the opening 14 is preferably chamfered at 28 and the edges of the track 11 are similarly chamfered at 29 to nest against the chamfer 28. With this arrangement the carriage may be easily rotated with respect to the bearing or track 11.

The bolt 22 extends through apertures 30 provided therefor in the lower extremities of the lugs 23 and 24 and supports a roller bearing 31 located between the lugs, and a tubular pressure member 32 located between lug 24 and a wing nut 33. The apertures 30 formed in the lugs are so positioned with respect to the abutments 26 that a portion of the head 34 of the bolt will engage the abutment 26 on the lug 23 and a portion of the inner end of the pressure member 32 will engage the abutment 26 on lug 24. In other words, clearance or relief is provided for the remaining portion or portions of the head 34 and pressure member 32. This allows the lugs to be drawn closer together at their lower ends than at their upper ends, thereby increasing the leverage at the points where most needed.

With this adjustable mechanism, tightening of the wing nut 33 on the bolt will effect plural locking actions by substantially simultaneously causing; the inner planar sides of the lugs to forcibly engage the parallel edges of the arcuate track 11, the curved or convex outer sides 27 of the lugs to engage the margin of the opening 14, the lateral offsets 25 on the lugs to engage the upper planar surface of the base 13 of the carriage, and the chamfer 28 on such base to engage the chamfers 29 on said track. The arrangement is preferably such that the carriage can be readily displaced by moving it along the track 11 to a horizontal position, or in a tilted position as exemplified by the dotted lines in Figure 5, and by a very slight tightening of the wing nut the carriage can be positively locked in the position selected, and while so locked may be manually rotated and automatically held to support the fish pole in a position most suitable or convenient for manipulation. In other words, the carriage is capable of movement bodily along the track as well as being rotatable about the lugs 23 and 24, the latter in effect constituting a pivot for the carriage. More specifically, the clamping action or coefficient of friction is somewhat greater with respect to locking the carriage in the selected position along the track as compared to locking the carriage in a rotative position. However, it is to be understood that if the clamping action is sufficiently increased by further tightening of the wing nut the carriage will be positively locked against movement in any direction.

The lugs 23 and 24 actually constitute a two-part locking pivot capable of lateral adjustment with respect to the carriage and track whereby to obtain an easy working, yet effective locking action. This feature of the invention is of considerable importance and has proven exceptionally satisfactory in use upon subjection to all operating conditions experienced in the field.

The head 34 of the bolt 22 is preferably of a size to engage the underside of the carriage to prevent rotation of the bolt. Obviously, other means might be employed to accomplish the same purpose. The roller bearing 31 carried by the bolt is so arranged that it may rotate on the bolt upon engagement with the underside of the track when the carriage is shifted along such track. This reduces friction and thereby promotes the ease of adjustment. It will be noted that the bolt and the pressure member 32 carried thereby are of a length to place the wing nut 33 at a relatively remote location to prevent interference with the movement of the carriage and for convenient operation.

The holder or cradle 4 adapted to receive the pole in a novel manner will now be described. This holder includes a pair of complementary jaws 35 which are pivotally connected at their ends 36 to the round spindle 5 above referred to, such ends being offset, flattened, and provided with round holes through which the spindle extends. The inner extremity of the spindle is in turn preferably pivotally attached to the lower portion of the rear part 15 of the carriage by inserting a loop 37 formed on the spindle into a pair of apertures 38 provided in such portion, the arrangement being such that the spindle is held against rotation so that a rest 39 permanently anchored to the outer extremity of the spindle is normally located in a predetermined upstanding position relative to the spaced corresponding supporting portions 20. The rest 39 may be constructed as desired but preferably is made in the shape of a V so as to position the pole centrally with reference to the carriage and includes an eye 40 which receives the outer extremity of the spindle and is secured thereto by a weld 41.

Figures 3, 4:
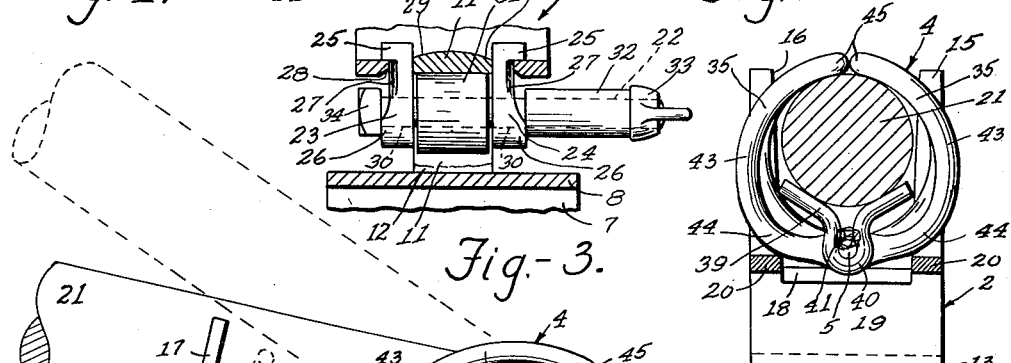
Figure 3 is a transverse section taken through an appropriate part of Figure 1 illustrating the means employed permitting adjustment of the carriage and locking of such carriage with respect to its mounting.
Figure 4 is a transverse section in elevation similar to Figure 2 showing a fish pole or rod disposed in the holder.

Each jaw is preferably made from a heavy gauge wire and includes a semi-circular portion 42 disposed substantially at right angles to the longitudinal axis of the spindle 5, an inclined or sloping portion 43, which as viewed in the drawing, extends downwardly and outwardly and thence inwardly to provide a cam portion 44. The semi-circular portions 42 are joined to the inclined portions 43 by reversely bent portions 45 which normally engage or abut each other as depicted in Figure 4 when the pole is properly seated in the holder. The portions 42 are disposed in the same general transverse plane with respect to the axis of the spindle due to the offset ends 36 and when brought together provide a circular enclosure for embracing the pole. The cam portions 44 are similarly disposed because of the adjacent offset ends. The inclined portions 43 when brought together provide an additional enclosure, generally oval or enlongated in formation, for receiving the pole at a point spaced forward from the enclosure defined by portions 42. The enclosure formed by the inclined portions 43 is wider adjacent the rest 39 than at any other point along the length of the holder and is particularly greater than the diameter of the circular enclosure formed by portions 42 in order to permit the pole to be freely received into the holder.

The various components or elements comprising the device are so constructed and arranged that the jaws are normally open as indicated by the dotted lines in Figure 2 so that the pole may be readily received in the forks or bifurcations formed in the parts 15 and 17 of the carriage prior to being entrapped by the jaws 35. Since most of the material of which the jaws are constructed is located on opposite sides of the spindle the weight of the jaws causes them to fall automatically to such open position. It will be noted in Figure 2 that the semi-circular portions 42 of the jaws are designed to preferably engage the base 13 of the carriage at points adjacent part 15 so as to predetermine the extent the jaws may open, and that the cam portions 44 of the jaws normally engage and bear against the supporting portions 20 to position the rest 39 thereabove.

To secure the pole in the holder it is merely necessary to place the butt end of the pole 21 into the bifurcations for guidance onto the V rest 39, and the moment it is engaged the hands may be removed from the pole so that its weight outward from the device will cause the rest and pole to swing or move downwardly and rock the cam portions 44 against the supporting portions 20 to actuate the jaws to entrap the pole in the position illustrated in Figures 4 and 5. When thus entrapped the pole will be supported on the rest at one point and backed against the reverse bends 45 adjacent portions 42 at a point spaced from the rest. Accordingly, it will be evident that the invention is of such a character that the holder is normally open to receive a pole and is automatically held therein by the weight of the pole. The pole may be easily released from the holder by lifting upwardly on the pole in the customary way whereupon the jaws will again automatically swing outwardly to the open position illustrated by the dotted lines in Figure 2 of the drawing. Operation of the holder is thereby controlled by manipulating the pole, this factor being particularly advantageous at the moment a signal is received that a fish has taken the hook.

The assembly is so constructed that the holder and pole held therein may swing sideways a limited extent with respect to the carriage, in which event the cam portions 44 of the holder will slide on the supporting portions 20. This lost-motion between the holder and carriage is another important feature of the invention as it provides for free movement of the operating parts and, among other things, serves to substantially maintain the pole in its original position, within practicable limits, whenever an anchored boat moves about in the water.

In view of the foregoing, it will be manifest that the device embodies automatic features conducive to good fishing, allowing one to have the full and free use of both hands. It is free of all forms of springs and various mechanisms present in other devices which require a multiplicity of manual adjustments to secure and release the pole. The subject invention makes it possible for one fisherman to readily manipulate a plurality of poles to good advantage. The device is of sturdy construction, easily adjustable and effective in operation under all conditions of use, the carriage and holder in combination serving to provide substantial dual means for supporting and holding a pole in place for convenient fishing.

While the subject invention has been shown and described as embodied in a specific construction, it is to be understood that the invention is not limited thereto but may be embodied in other constructions and the form and arrangement of the several parts thereof may be modified within the limits defined by the appended claims.

I claim:

1. A device for supporting a pole comprising a mounting, a carriage adjustably connected to said mounting and having spaced parts upon which a pole may find support, and a movable locking member connected to said carriage between the spaced parts for locking the pole to the carriage when supported on said spaced parts.

2. A device for supporting a pole comprising a mounting, a carriage attached to said mounting and having spaced upstanding parts provided with bifurcations for receiving a pole, and a movable member secured to the carriage between said upstanding parts for locking the pole to the carriage when received in the said bifurcations.

3. A device for supporting a pole comprising a mounting, a carriage attached to said mounting and provided with longitudinally spaced bifurcations for receiving a pole, and a pair of movable jaws loosely connected to said carriage disposed adjacent the bifurcations for locking the pole to the carriage when received in the said bifurcations.

4. A device for supporting a pole comprising a carriage provided with longitudinally spaced bifurcations for receiving a pole, a spindle mounted on said carriage and extending lengthwise between said bifurcations, and a holder comprising a pair of movable jaws connected to said spindle for locking the pole to the carriage when received in the said bifurcations.

5. A device for supporting a pole comprising a mounting for attaching the device to a support, a carriage secured to said mounting, a spindle mounted on said carriage, and a pair of jaws pivotally connected to said spindle for embracing and supporting a pole.

6. A device for supporting a pole comprising an elongated carriage, and a pair of jaws extending lengthwise of the carriage and pivotally connected to the end extremities thereof for embracing the pole at longitudinally spaced locations.

7. A device for supporting a pole comprising a mounting, an elongated carriage adjustably attached to said mounting, said carriage being provided with an upright part adjacent each extremity, a pair of jaws for embracing the pole extending lengthwise of the carriage and having pivotal connection with said carriage adjacent the said upright parts, said jaws being constructed and arranged to be normally open and being operable by the weight of the pole.

8. A device for supporting a pole comprising a mounting, an arched track disposed on said mounting, a carriage having an opening, a pivot means straddling the track and extending into said opening for operatively connecting said carriage to said track, and manually controlled means whereby the pivot means may be operated to lock the carriage in any desired position relative to the track.

9. A device for supporting a pole comprising a mounting, an arched track on said mounting, an elongated carriage mounted on said track, an opening in said carriage, a pair of members having portions extending into said opening and portions straddling the track, means for actuating the member to lock the carriage in a desired position on said track, a pair of spaced uprights on said carriage provided with bifurcations for receiving a pole, a spindle attached at one end to one extremity of the carriage and extending lengthwise of the carriage between the uprights, a pair of jaws also extending lengthwise of the carriage and having ends pivotally connected to the spindle at points adjacent the uprights, and said spindle, said carriage, and said jaws being constructed and arranged in a manner whereby the weight of the jaws assist in maintaining the spindle in a tilted position and the jaws in a normally open condition so that when a pole is placed in the bifurcations the spindle will be moved in a direction to cause the jaws to embrace the pole and wherein lifting the pole in the customary way will automatically allow the jaws to open to release the pole.

10. A device for supporting a pole comprising an elongated carriage having longitudinally spaced parts provided with bifurcations for receiving the pole, a pair of elongated holding members having ends connected adjacent to the said spaced parts for movement relative to the carriage for retaining the pole when disposed in said bifurcations, and lugs cooperating with the carriage for attaching the carriage to a support.

11. A sub-assembly for a pole supporting device comprising an elongated spindle, and a pair of elongated jaw members having ends pivotally connected to the spindle, and said spindle being provided with means for attaching the spindle to a support.

WARD E. NICKERSON.

REFERENCES CITED

The following references are of record in the file of this patent:

UNITED STATES PATENTS

| Number | Name | Date |
|---|---|---|
| 1,963,463 | Hammer | June 19, 1934 |
| 2,143,109 | Hadaway | Jan. 10, 1939 |
| 2,243,388 | Magyarosi | May 27, 1941 |
| 2,446,282 | Hart | Aug. 3, 1948 |
| 2,472,059 | Arwood | June 7, 1949 |